July 31, 1923.

R. H. JOHNSON

DISPLAY DEVICE

Filed Dec. 8, 1919

1,463,470

Inventor:
Ross H. Johnson
by: his Atty

Patented July 31, 1923.

1,463,470

UNITED STATES PATENT OFFICE.

ROSS H. JOHNSON, OF ST. PAUL, MINNESOTA.

DISPLAY DEVICE.

Application filed December 8, 1919. Serial No. 343,219.

*To all whom it may concern:*

Be it known that I, Ross H. Johnson, a citizen of the United States, residing at St. Paul, in the county of Ramsey and State of Minnesota, have invented a new and useful Improvement in Display Devices, of which the following is a specification.

My invention relates to a display device which is designed to readily attract and hold the attention of the observer long enough to impress the mind with the particular display used on the device.

My device comprises features which are designed to easily attract the eye of a person and to hold their attention to fully impress them with the display illustrated or disclosed on the device.

A feature of my invention is to provide a device with means for displaying articles or other matter to make a true comparison so that the observer can readily see for himself the importance of becoming familiar with the display illustrated by my device.

It is a well known fact that the eye is most easily attracted to moving objects and with this in mind I have designed my device with movable elements which primarily attract the eye and then make up a display which will be interesting enought to hold the attention of the observer.

In the drawings forming part of this specification:

Figure 1:
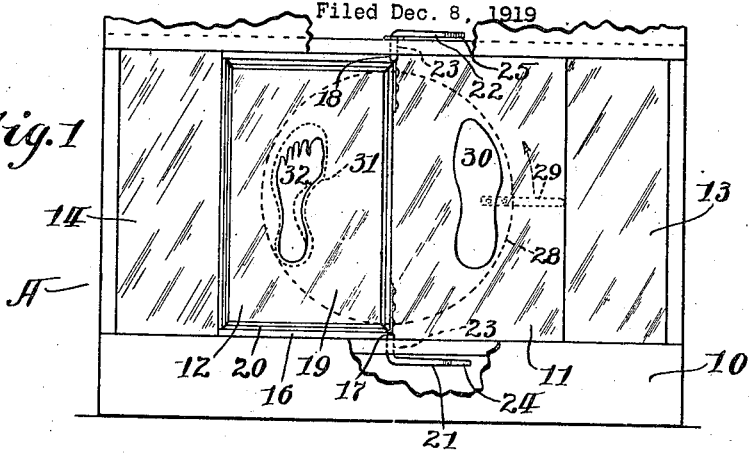
Figure 1 is a front view of my display device, part of which is broken away.

The drawings illustrate a display device A which is in the form of a cabinet, having a front or display face 10. Centrally positioned in the face 10 are inwardly extending, angularly positioned display windows 11 and 12 and on either side of the windows 11 and 12 are positioned display windows 13 and 14. The windows 13 and 14 extend in a line or parallel with the front of the device A while the windows 11 and 12 extend inwardly at an angle, thereby giving an attractive appearance to the front or display face 10 of the cabinet. The windows 11 and 12, together with the display windows 13 and 14, extend approximately the full width of the cabinet A across the display face 10.

The display windows 11, 12, 13 and 14 are translucent so that the rays of light of suitable electric bulbs 15 will shine through the same to illuminate the windows if it is desired. The bulbs 15 are of any suitable construction and connected in an ordinary manner with a source of electrical energy, being adapted to be operated intermittently or continuously, as may be desired, by ordinary, wellknown methods. The bulbs 15 are positioned in the cabinet of the device concealed from view by the display windows. The display windows are formed of frosted glass or other translucent material to conceal the inner parts of the cabinet of the device A but to readily allow light from the bulbs 15 to pass through the same and thereby illuminate a display which is adapted to be exposed on the display windows 11, 12, 13 and 14.

A movable element 16 is pivotally held at 17 and 18 in the frame of the device A and is provided with a translucent display panel 19, which is held in a suitable manner in the frame 20 of the element 16 so that when the element 16 is turned on its pivot points its display panel 19 will swing adjacent and extend parallel to either of the windows 11 or 12, the display panel 19 coming in close proximity to either window. The display panel 19 can be composed of glass, celluloid or any other suitable translucent or transparent material.

Operating arms 21 and 22 are connected to the vertically extending shafts 23 which hold the member 16 pivotally at 17 and 18 and the arms 21 and 22 extend horizontally practically in line with the member 16 toward the back of the device A. Each operating arm is formed with a bent or curved engaging end 24 and 25, respectively, which extend in opposite directions from each other, as is illustrated in the plan view in Figure 2, while the arms 21 and 22 extend in line with each other so that when the end 25 of the arm 22 is in position to be engaged the other end 24 of the arm 21 is out of line to be engaged.

A suitable electric operating motor B is positioned in the cabinet of the device A back of the pivot points of the members 16 and is connected to any suitable source of electrical energy, switches, etc., not illustrated in the drawings, to properly operate the same. A shaft 26 is connected by suitable reduction gearing in the housing 27 with the motor B to rotate the shaft 26 at a slow rate of speed. A disk 28 is rigidly secured to the shaft 26 and carries a projecting operating arm 29, which is moved in the path of the ends 24 and 25 of the arms 21 and 22 so as to engage these ends when they are projecting in position in the path of rotation of the operating arm 29.

In the operation of the device A, when the motor B is operating the arm 29 to rotate the same in the direction of the arrow illustrated in Figure 1, the ends 24 and 25 of the arms are engaged to swing the member 16 on its pivot points from one side to the other, adjacent either the display windows 11 and 12, alternately, this operation continuing throughout the operating of the device A by the motor B and causing the movable element to move from one side to the other and from one display window to the other, allowing it to remain a short time at either of the windows 11 and 12.

The operating arm 29 is rotated slowly and this gives the movable element a resting period between each operation or between its positioning at either of the windows 11 and 12. By means of suitable construction the length of time between operation of the elements 16 can be varied to suit the occasion. It is essential, however, that the period of rest of the element 16 be sufficiently long to allow the ordinary observer to gather the information from the display on the device A.

A suitable and attractive method of illustrating a display on the windows of the device A is shown in Figure 1, which illustrates the sole 30 of an ordinary, wellknown form of shoe on the window 11, while the window 12 has illustrated thereon the sole 31 of another wellknown make or form of shoe and the movable element 16 carries an illustration 32 of the natural form and shape of a foot, on the panel 19. All of the illustrations are arranged in line so that the illustration 32 of the foot on the panel 19 will coincide with either the sole of the illustration 30 or the illustration 31. Thus when the member 16 is swung from one window to the other it will illustrate the foot outline 32 as it would appear in one form of shoe and as it would be compared with the other form of shoe. For instance, the natural shape of the foot illustrated by 32 in the drawing would not readily be comfortable in the outline of the sole of the shoe 30, whereas it would fit naturally in the outline of the shoe 31, thereby making a true comparison, which will illustrate at a glance facts that could not otherwise be easily explained. The display device A thus accomplishes a unique purpose, making a comparison from one article to another automatically.

The windows 13 and 14 on either side of the general display are primarily for the other illustrations or printed matter which it is desired to display in connection with the center or main display. The motor B will continue to operate the member 16 of the device A and the moving element will cause an easy attraction for the eye while the comparison makes an interesting display to hold the attention of the observer.

Figure 2:
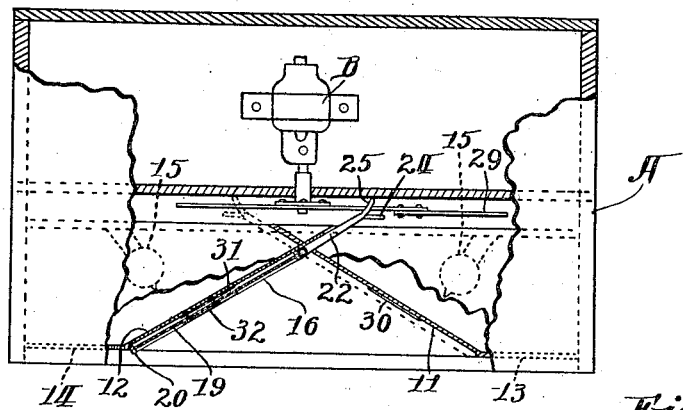
Figure 2 is a plan view of the display device, portions of which are broken away.
Figure 3:
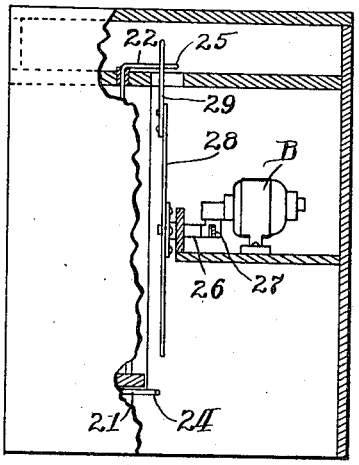
Figure 3 is an end view of the display device having part of the casing broken away to expose some of the operating parts.
Figure 4:
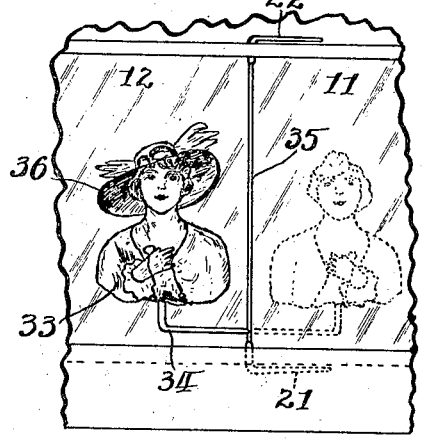
Figure 4 is a detail portion of a front view of my device illustrating another construction.

Figure 4 illustrates another form of display and in this construction a suitable figure 33, which is secured to the arm 34, takes the place of the member 16 illustrated in Figures 1 and 2. The arm 34 is secured to the vertical shaft 35. The shaft 35 takes the place of the shafts 23 of the former construction and is pivoted in the frame of the device A, having the same operating arms 21 and 22 as heretofore described. The figure 33 illustrates a fanciful bust of a lady and the window 12 carries a suitable illustration 36 of a certain style hat, while the window 11 can carry another style of hat not illustrated in the drawing, or can be left without any illustration. In this construction when the operating arms 21 and 22 are engaged by the operating arm 29 the figure 33 will be brought adjacent either the window 11 or 12 and thereby illustrate and compare the figure with or without the hat 36 illustrates. The figure 33 is preferably translucent so as to illustrate the display on either side, or has the display printed on each side. This form of display is only illustrative and it is obvious that it can be arranged or any other suitable display can be used in the most adaptable manner. By suitable variations the display device A can be made very attractive.

An important feature of the invention is the comparison, which is made practical by a movable element from one display window to the other.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. A display device, including a display window having two displays and means adapted to carry another display so as to be brought adjacent said disply window at each of said displays to make a comparison of said display.

2. A display device, including a display window having two display members positioned thereon, a display element pivotally connected to said device and means adapted to swing said element from one display member to the other display member in front of said display window for the purposes specified.

3. A display device, including an enclosing cabinet, a display window formed on one side of said cabinet, a movable display member pivoted in said cabinet and means adapted to cause said display member to move from one position to another to display an illustration carried by said movable member to one position and then to another in front of said display window.

4. In a device of the class described, comprising display windows adapted to illustrate a display, a display element adapted to be swung from one position to another position adjacent said display windows and means for intermittently operating said movable display element.

5. In a device of the class described, including an enclosing cabinet, a display window across the front of said cabinet, the central portion of said display window extending inward, a movable element adapted to carry a display to be moved adjacent either side of the inwardly extending portion of said display window and means for intermittently operating said movable element with its display for the purposes specified.

6. A display device, including an enclosing cabinet, a translucent display side on said cabinet, lights adapted to illuminate said display side, a movable element adapted to be intermittently brought adjacent said display side at different places to complete a display and means for operating said movable element.

7. A display device, including an inclosure, a translucent display portion formed on said inclosure, lights adapted to illuminate said translucent portion, said translucent portion being adapted to carry a display, a movable element adapted to carry another display and means for intermittently operating said movable element to cause its display to be compared with the display illustrated on said translucent portion of said device for the purposes specified.

8. A display device, including a translucent display window which is adapted to illustrate a display, a display element pivotally secured to said device, operating arms adapted to move said display element to swing it from adjacent one portion of the translucent display window to another portion, engaging ends formed on the free ends of said arms which are adapted to extend in opposite directions to each other and means for engaging said ends intermittently to operate said movable element.

9. A display device, including an enclosing cabinet, a translucent display window formed along one side of said cabinet, a central inwardly extending, angular portion formed in said display window, a movable element having a display which is adapted to be brought adjacent the sides of the inwardly extending portions of said window at either side of said inwardly extending portion intermittently, operating arms secured to said movable element having oppositely extending ends and means adapted to be rotated so as to intermittently engage said oppositely extending ends to operate said movable element to either one side or the other of said inwardly extending portion of said display window.

10. A display device including an enclosing cabinet, a translucent display window formed along one side of said cabinet, a central inwardly extending angular portion formed in said display window, a movable element mounted on a vertical axis having a display which is adapted to be swung adjacent the sides of the inwardly extending portions of said window at either side of said inwardly extending portions, a pair of arms secured to said display extending rearwardly from the same in the plane thereof, a pair of curved fingers bent outwardly from said arms and a rotating cam secured to a shaft positioned at right angles to said display member axis, in a plane containing said axis, between said two arms, adapted to intermittently and alternately move said display members to its two extreme positions.

11. A display device comprising a member having a portion of a complete display element, a second member having a portion of a display element similar to said first display element, and a third member having a portion of a display element adapted to be associated with either of said first or second display portions, and means for alternately and intermittently bringing said third display portion in proximity to said first and second display portions.

12. A display device comprising a display member having a display thereon, a second display member having a display thereon similar to said first display and a movable display member having a display adapted to be associated with said first and second displays, and means for alternately and intermittently superimposing said third display member over said first and second display members.

13. A display device including two fixed translucent displays, a movable display and means for successively bringing said movable display in proximity to each of said translucent displays so that the same may be viewed alternately in combination therewith.

14. A display device comprising an incomplete display, a movable member having display means complemental to said incomplete display, and means for intermittently bringing said movable display member in proximity to said incomplete display.

15. A display device comprising a plurality of incomplete display devices, a complemental display device, and means for successively displaying said complemental display in proximity to said incomplete displays.

16. A display device comprising two incomplete displays, a movable member, having display means complemental to said incomplete displays, and means for successively bringing said movable display member in proximity to said incomplete displays.

17. A display device comprising a pair of display members arranged in V-shaped relation, and a movable display member pivoted in the vertex of said V and adapted to be moved from one of said display members to the other.

18. A display device comprising a pair of display members, a movable display member, similar display means on both of said display members, display on said movable member similar to said other displays, said display on said movable member being adapted to be successively positioned adjacent each of said other displays so that the same becomes superimposed over and above said other displays whereby both of said displays may be viewed in their entirety in each position thereof.

ROSS H. JOHNSON.